US007492568B2

(12) United States Patent
Takayanagi

(10) Patent No.: US 7,492,568 B2
(45) Date of Patent: Feb. 17, 2009

(54) MAINTENANCE-FREE STATIC ELIMINATOR

(75) Inventor: Makoto Takayanagi, Shizuoka (JP)

(73) Assignee: Trinc.Org, Shizuoka-pref (JP)

( * ) Notice: Subject to any disclaimer, the term of this patent is extended or adjusted under 35 U.S.C. 154(b) by 0 days.

(21) Appl. No.: 11/688,784

(22) Filed: Mar. 20, 2007

(65) Prior Publication Data

US 2007/0258183 A1 Nov. 8, 2007

(30) Foreign Application Priority Data

Apr. 5, 2006 (JP) ............................ 2006-103793

(51) Int. Cl.

| | |
|---|---|
| ***H02H 1/00*** | (2006.01) |
| ***H02H 1/04*** | (2006.01) |
| ***H02H 3/22*** | (2006.01) |
| ***H05F 3/00*** | (2006.01) |
| ***H05F 3/02*** | (2006.01) |
| *H01H 47/00* | (2006.01) |

(52) U.S. Cl. ...................... 361/212; 361/220; 361/221; 361/222

(58) Field of Classification Search ...................... None
See application file for complete search history.

(56) References Cited

U.S. PATENT DOCUMENTS

| | | | | |
|---|---|---|---|---|
| 6,419,171 | B1 * | 7/2002 | Takayanagi | 239/690 |
| 2006/0045559 | A1 * | 3/2006 | Zona | 399/100 |
| 2006/0232908 | A1 * | 10/2006 | Izumi et al. | 361/220 |

* cited by examiner

*Primary Examiner*—Michael J Sherry
*Assistant Examiner*—Dharti H Patel
(74) *Attorney, Agent, or Firm*—Leighton K. Chong

(57) ABSTRACT

A static eliminator comprises at least one discharge needle for generating ions to eliminate static charge. A first hollow cylinder includes at least one opening for ions generated by the discharge needle to be emitted outside and provided with brushes for cleaning the discharge needle. A second hollow cylinder is provided with the discharge needle and rotatably disposed inside the first hollow cylinder. A discharge needle rotating mechanism is provided for causing to rotate the second hollow cylinder around the axis thereof to clean the discharge needle by wiping the discharge needle with the brushes.

10 Claims, 5 Drawing Sheets

MAINTENANCE-FREE STATIC ELIMINATOR

TECHNICAL FIELD

This invention generally relates to a static eliminator, and more particularly, to a maintenance-free static eliminator.

BACKGROUND OF INVENTION

Conventional static eliminators in which discharge needles or discharge electrodes are manually cleaned have been popular or mainline. In the case of manually cleaning, the system in which a vacuum sweeper is connected to the static eliminator and then discharge needles are manually cleaned while the swept dust is sucked in has been proposed. Although there was an automatically cleaning type of static eliminator using a motor, the swept dust could not be recovered or collected.

As mentioned above, there has been no maintenance-free static eliminator in which the discharge needles are automatically cleaned completely and at the same time the flied dust is collected automatically.

The users in fact are reluctant to carry out the operation of maintenance because of bother although the static eliminator is required to be maintained periodically, and thus in many cases the performance of static eliminator could not be brought out.

Therefore, it is an object of the present invention to provide a maintenance-free static eliminator.

SUMMARY OF INVENTION

To accomplish the object, there is provided a static eliminator which comprises at least one discharge needle for generating ions to eliminate static charge, a first hollow cylinder including at least one opening for ions generated by said discharge needle to be emitted outside and provided with brushes for cleaning said discharge needle, a second hollow cylinder provided with said discharge needle and rotatably disposed inside of said first hollow cylinder, a discharge needle rotating mechanism for causing to rotate said second hollow cylinder around the axis thereof to clean said discharge needle by wiping said discharge needle with said brushes To accomplish the object, there is also provided a static eliminator which comprises at least one discharge needle for generating ions to eliminate static charge, a box type of housing provided with said discharge needle inside of said housing and openings for emitting outside ions generated from said discharge needle, a brush driver attached to said housing for swinging brushes to wipe the dust attached to the discharge needle with the brushes, and a first fan with a filter for sucking air in from outside the box through the opening and discharge clean air after removing the floating dust wiped away from said discharge needle by the brushes.

To accomplish the object, there is also provided a static eliminator which includes discharge needles for static elimination and means for cleaning the discharge needles periodically comprising means for calculating cleaning date on the basis of periodic data for cleaning the discharge needles, means for comparing calendar date and the date calculated by said calculating means to determine the cleaning date, means for comparing the time data and clock time to determine the commencement of cleaning when the cleaning date comes, and means for carrying out the cleaning by actuating the cleaning means in accordance with the indication of commencement, the external indication from the outside or the indication of dust sensor.

Other objects, features, and advantages of the present invention will be explained in the following detailed description of the invention having reference to the appended drawings:

BRIEF DESCRIPTION OF DRAWINGS

FIG. 4 is a cross sectional view for explanation of the ion emission when ions are emitted and the suction of outside air when discharge needles are cleaned, FIG. 9 is a view for explanation of a box type of calm static eliminator according to the 4th embodiment of the present invention, FIG. 11 is a cross sectional view for explanation of a box type of static eliminator with a fan according to the 6th embodiment of the present invention, FIG. 12 is a cross sectional view for explanation of a box type of static eliminator with a fan according to the 7th embodiment of the present invention.

DETAILED DESCRIPTION OF THE INVENTION

First Embodiment

Figure 1:
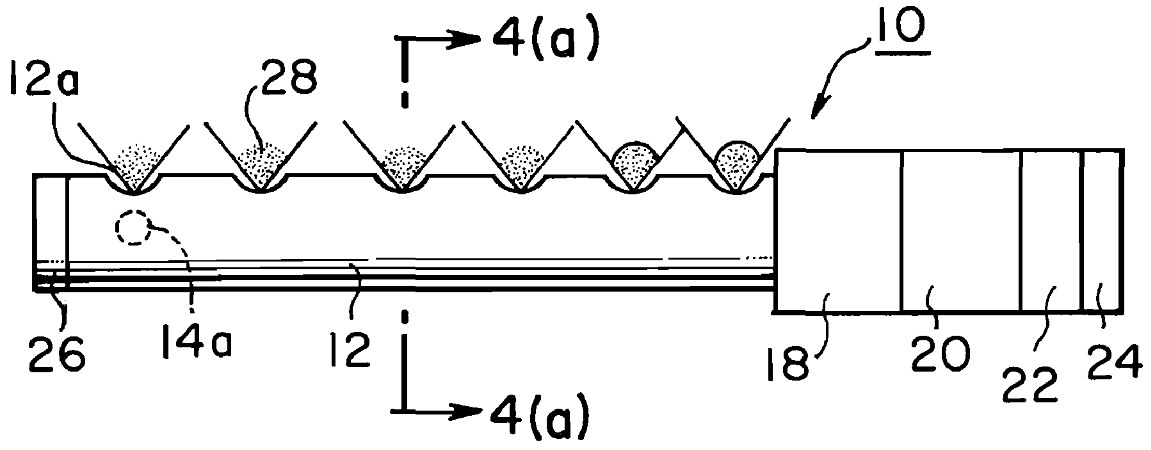
FIG. 1 is a front view for explanation of a static eliminator according to first embodiment of the present invention when ions are emitted.
Figure 2:
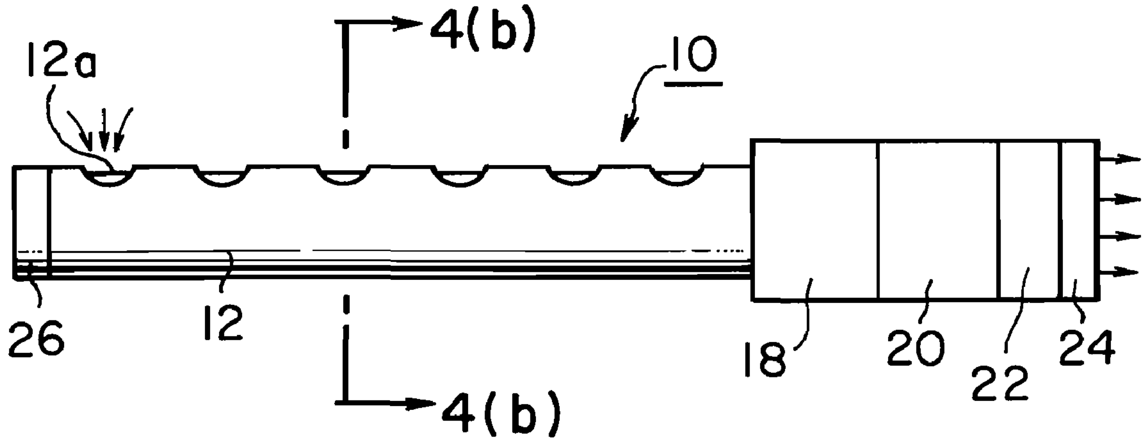
FIG. 2 is a front view for explanation of a static eliminator according to first embodiment of the present invention when discharge needles are cleaned.
Figure 3:
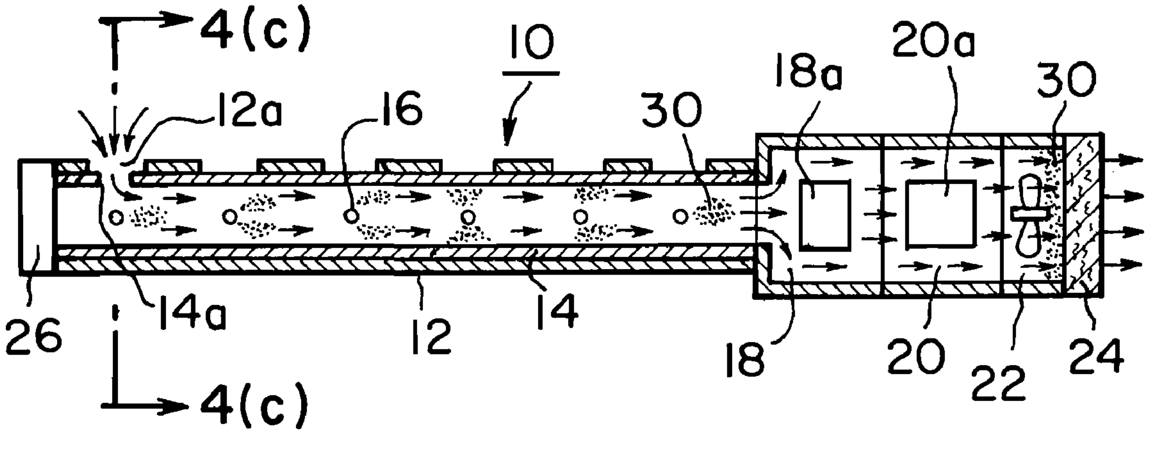
FIG. 3 is a cross sectional view for explanation of a static eliminator according to the first embodiment of the present invention when discharge needles are cleaned.
Figure 4A:
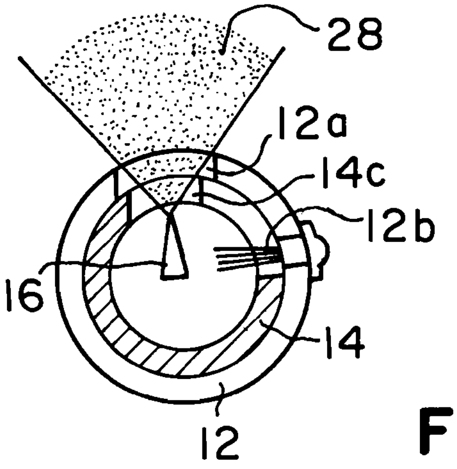
FIG. 4*a* is an enlarged cross sectional view taken along line 4(*a*)-4(*a*) of FIG. 1.
Figure 4B:
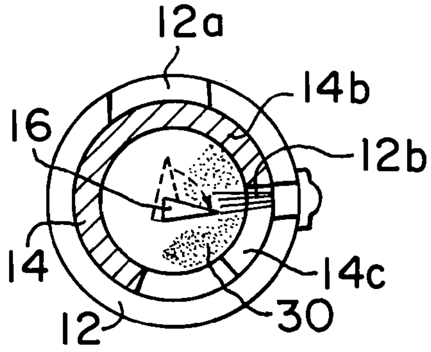
FIG. 4*b* is a an enlarged cross sectional view taken along line 4(*b*)-4(*b*) of FIG. 2.
Figure 4C:
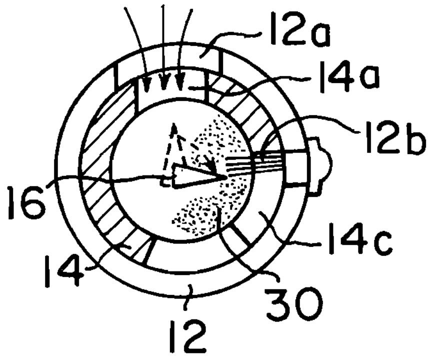
FIG. 4*c* is a an enlarged cross sectional view taken along line 4(*c*)-4(*c*) of FIG. 3.

FIG. 1 is a front view for explanation of a static eliminator according to first embodiment of the present invention when ions are emitted, FIG. 2 is a front view for explanation of a static eliminator according to first embodiment of the present invention when discharge needles are cleaned, FIG. 3 is a cross sectional view for explanation of a static eliminator according to the first embodiment of the present invention when discharge needles are cleaned, FIG. 4 is a cross sectional view for explanation of the ion emission when ions are emitted and the suction of outside air when discharge needles are cleaned, FIG. 4*a* is an enlarged cross sectional view taken along line 4(*a*)-4(*a*) of FIG. 1, FIG. 4*b* is a an enlarged cross sectional view taken along line 4(*b*)-4(*b*) of FIG. 2, and FIG. 4*c* is a an enlarged cross sectional view taken along line 4(*c*)-4(*c*) of FIG. 3.

In FIGS. 1 to 4, a static eliminator 10 has a fixed hollow cylindrical housing such as a first cylinder 12 and an inside hollow cylinder or a second cylinder 14 which is rotatably positioned inside of the first cylinder 12 to clean discharge needles 16. Each of these cylinders 12 and 14 is closed by a cover 26 at its one end, and a driver 18 which is provided with a drive body 18*a* for rotationally driving the second cylinder 14, power supply 20 provided with a power supply body 20*a* and a fan with filter 24 are disposed at the other end. Furthermore, the discharge needles are provided with a dust sensor, not shown, to indicate the time of cleaning of discharge needles, if necessary.

The first cylinder 12 is formed with openings 12*a* in a line along the first cylinder 12. The first cylinder 12 is provided with brushes 12*b* to remove the dust from the discharge needles 16 by wiping them, see FIGS. 4*b* and 4*c*.

As shown in FIG. 4*a*, the second cylinder 14 is formed with ion discharging openings 14*c* which are in alignment with the openings 12*a* of the first cylinder 12 at the rotational position of the second cylinder 14 in which ions are generated. Consequently ions 28 which are generated by discharge needles 16 provided inside of the second cylinder 14 are emitted or discharged through the openings 14*c* and the openings 12*a*. As shown in FIG. 4*b*, the second cylinder 14 is provided with a portion 14*b* which closes the other openings 12*a* except one opening 12*a* of the first cylinder 12 at the rotational position in which the discharge needles are cleaned. Furthermore, as shown in FIG. 4*c*, the second cylinder 14 is formed with one outside air sucking opening 14*a* which is in alignment with one of the openings such as the opening of the first cylinder adjacent the cover 26 in the first embodiment. Consequently the outside air is sucked in the second cylinder 14 though the openings.

Now an explanation on static eliminating operation by discharge needles and cleaning operation of the discharge needles will be made. At the time of static elimination, the discharge needles and the second cylinder 14 are brought to the rotational position as shown in FIG. 4*a* by the driver of discharge needle rotating mechanism 18. In the state, electric power is supplied to the discharge needles 16 from the power supply 20 and thus the discharge needles 16 generate ions 28.

In the case of cleaning operation of the discharge needles 16, by the discharge needle rotating mechanism 18 the second cylinder 14 is brought to the rotational position as shown in FIGS. 4*b* and 4*c* in which the discharge needles are cleaned from the rotational position as shown in FIG. 4*a* in which static elimination is carried out. At that time, the dust 30 attached to the discharge needles 16 is wiped away by the brush 12*b* to float in the air. When the dust is in the floating state, electric power is supplied from the power supply 20 to the fan 22 with filter. As a result, the outside air is sucked in the second cylinder 14 only through the opening 12*a* of the first cylinder 12 and the outside air sucking opening 14*a* of the second cylinder 14 and then inside the second cylinder 14 the floating dust is carried toward the filter 24 together with the outside air thus sucked. The filter 24 gathers the dust and only clean air is discharged outside.

Second Embodiment

Figure 5:
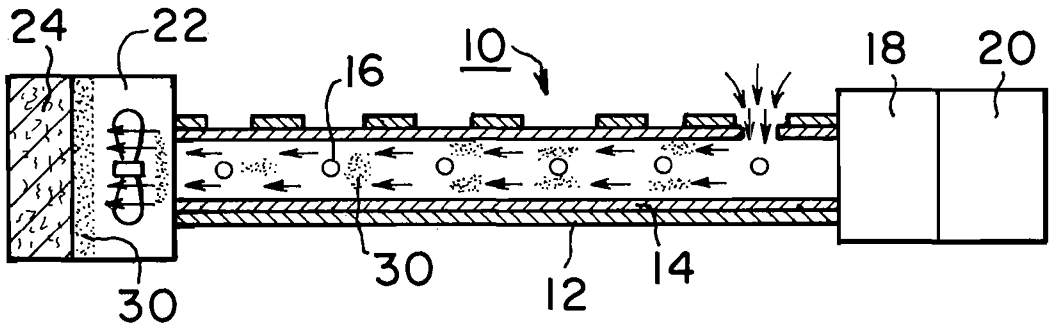
FIG. 5 is a cross sectional view for explanation of a static eliminator according to the second embodiment of the present invention when discharge needles are cleaned.

FIG. 5 is a cross sectional view for explanation of a static eliminator according to the second embodiment of the present invention when discharge needles are cleaned. In the second embodiment, the fan 22 with filter is provided on the first cylinder 12 and the second cylinder 14 at the opposite side of the driver 18 and the power supply 20. The discharging operation and the cleaning operation are similar to those of the first embodiment.

Third Embodiment

Figure 6:
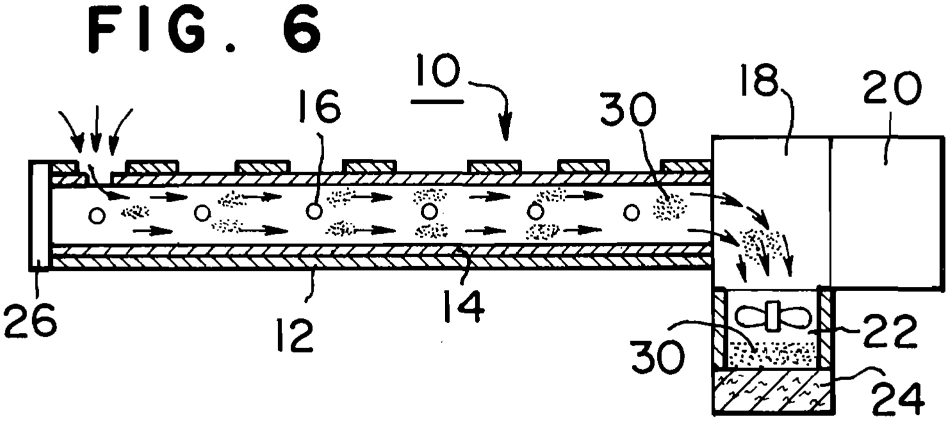
FIG. 6 is a cross sectional view for explanation of a static eliminator according to the third embodiment of the present invention when discharge needles are cleaned.

FIG. 6 is a cross sectional view for explanation of a static eliminator according to the third embodiment of the present invention when discharge needles are cleaned. In the third embodiment, the fan 22 with filter is provided adjacent the driver 18. The discharging operation and the cleaning operation are similar to those of the first embodiment.

4th Embodiment

Although in the above-mentioned first to third embodiments the housing of the static eliminator is of a bar type, in the embodiment described hereinafter the housing of the static eliminator is of a box type. Furthermore, the box type of static eliminator includes a type of calm static eliminator in which emission or discharge of ions is made by coulombic repulsion not using air blow by the fan and the other type of static eliminator with fan in which emission or discharge of ions is made using air blow by the fan, and therefore these types of static eliminator will be explained individually.

Figure 9A:
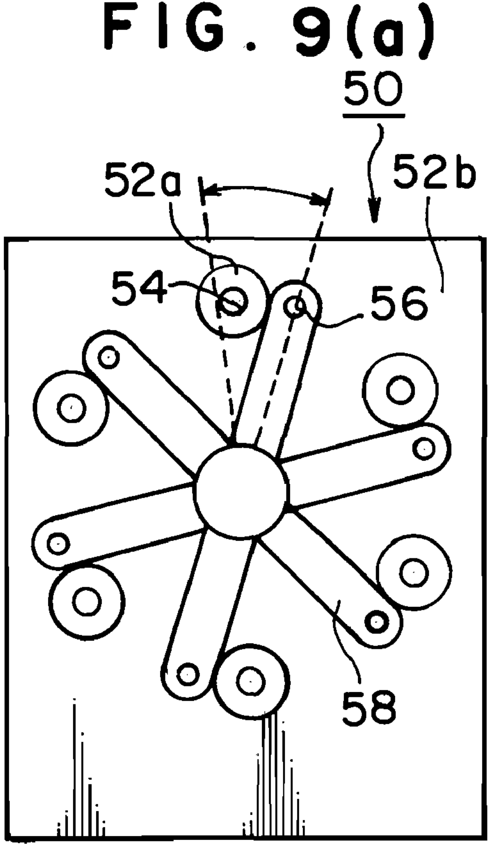
FIG. 9*a* is a front view of the static eliminator.
Figure 9B:
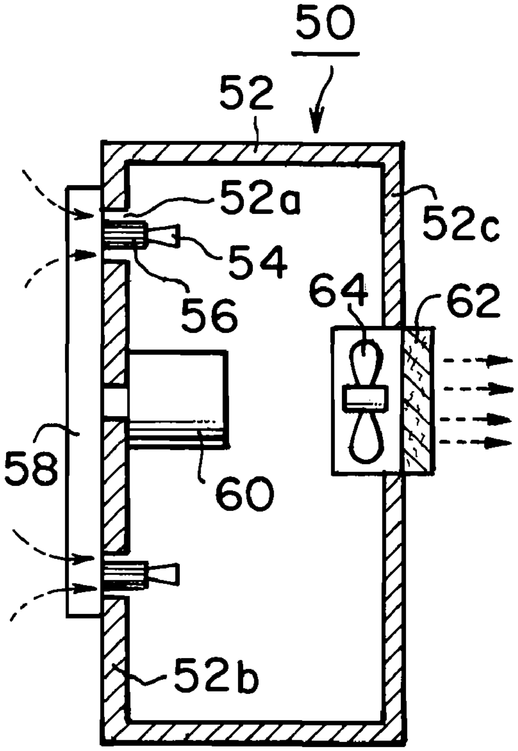
FIG. 9*b* is a cross sectional view of the static eliminator.

FIG. 9 is a view for explanation of a box type of calm static eliminator according to the 4th embodiment of the present invention, FIG. 9*a* is a front view of the static eliminator, and FIG. 9*b* is a cross sectional view of the static eliminator. In FIG. 9 the static eliminator 50 has a box type of housing 52. the housing 52 is formed with circular openings 52*a* at its front portion to emit outwardly ions which are generated from the discharge needles 54 disposed inside the housing 52. A plurality of discharge needles, 6 discharge needles in this embodiment, are disposed circumferentially. Furthermore, the discharge needles are provided with dust sensor, not shown, to sense dirtiness of the discharge needle and indicate the time when the discharge needles should be cleaned in response of extent of dirtiness.

A brush 56 is disposed to wipe each of discharged needles 54. The brushes 56 are provided on arms 58 at their ends, and each arm 58 is attached to an arm swing mechanism or brush driver 60 which is attached to the front portion 52*b* of the housing at the center position of discharge needles. The brush driver 60 swings the arms 58 within a predetermined region as indicated by arrows to wipe away the dust attached to the discharge needles 54 therefrom. Meanwhile a suction fan 64 with suction filter 62 is attached to the rear portion 52*c* of the housing 52.

At the time of static elimination, the arm 58 is brought to the position as in shown in FIG. 9*a* and ions are generated by power supplied from the power supply, not shown, to the discharge needles to carry out static elimination. At the time of cleaning, the brush driver 60 is actuated to wipe away the dust attached to the discharge needles therefrom and to float the dust. At the same time of actuation of brush driver 60, the fan 64 with suction filter 64 is actuated to suck the floating dust in by outside air as indicated by the dotted arrows and to transfer the dust toward the suction fan 64. Finally the clean air in which the dust is removed is discharged outside of the housing 52.

5th Embodiment

Figure 10:
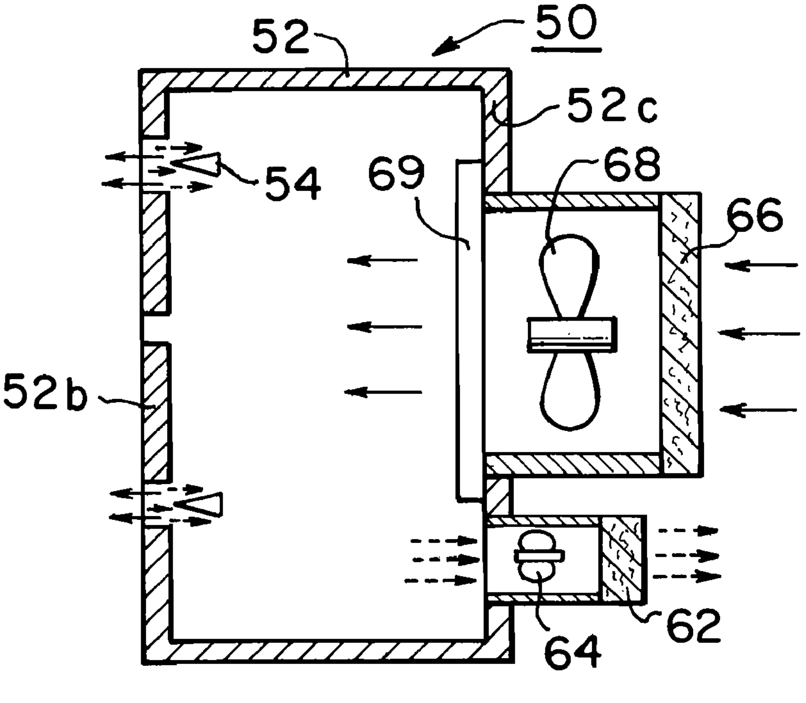
FIG. 10 is a cross sectional view for explanation of a box type of static eliminator with a fan according to the 5th embodiment of the present invention.

FIG. 10 is a cross sectional view for explanation of a box type of static eliminator with a fan according to the 5th embodiment of the present invention. In FIG. 10, for convenience of drawing, the brush, the arm, and the brush driver as shown in FIG. 9 are omitted. In FIG. 10, in addition to the suction fan 64 with filter 62, an air blow fan 68 with filter 66 is attached to the rear portion 52*c* of the housing 52.

At the time of static elimination, while ions are emitted from the discharge needles the air blow fan 68 with filter 66 is actuated to suck the clean air in from the outside as shown in arrows, to send the clean air toward the discharge needles and to fly away the ions thus emitted. At the time of cleaning, the air blow fan 68 is turned down and a shutter 69 is closed to shut off the air blow. As is the case with the 4th embodiment, only the suction fan 64 is actuated to remove the dust from the discharge needles.

6th Embodiment

Figure 11A:
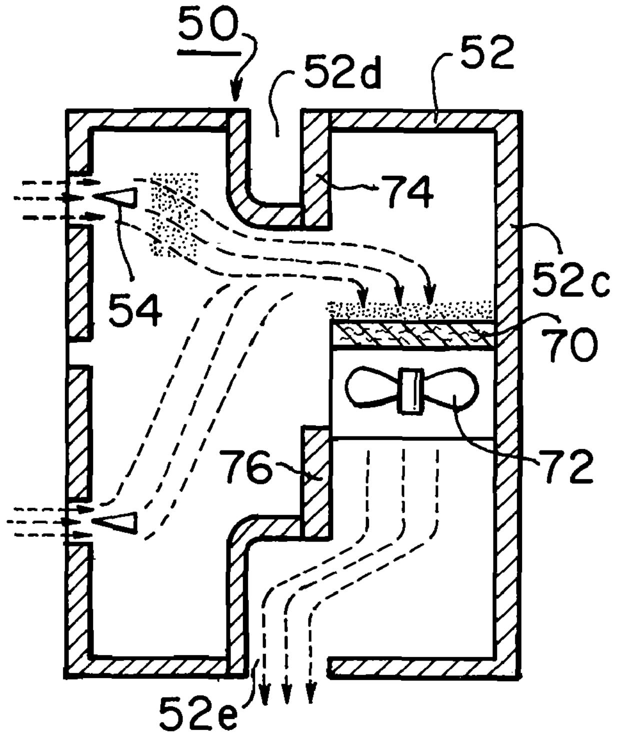
FIG. 11*a* shows the state inside the static eliminator at the time of cleaning.
Figure 11B:
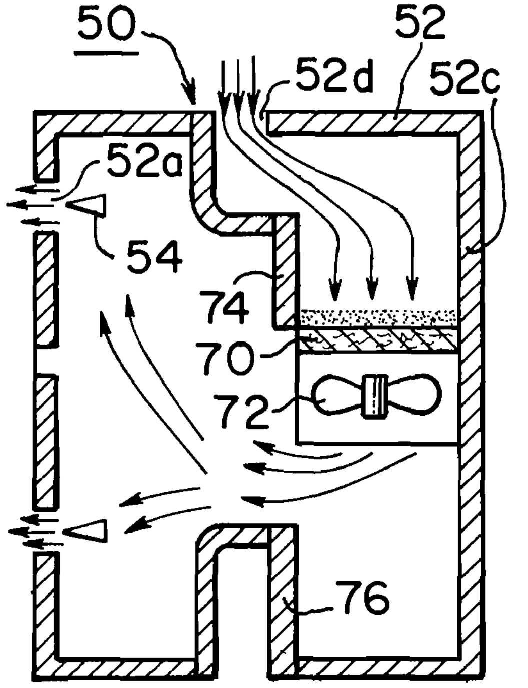
FIG. 11*b* shows the state inside the static eliminator at the time of discharging.

FIG. 11 is a cross sectional view for explanation of a box type of static eliminator with a fan according to the 6th embodiment of the present invention, FIG. 11*a* shows the state inside the static eliminator at the time of cleaning, and FIG. 11*b* shows the state inside the static eliminator at the time of discharging. In FIG. 11, for convenience of drawing, the brush, the arm, and the brush driver as shown in FIG. 9 are omitted. In FIG. 11, instead of the suction fan and the air blow fan as provided in the 5th embodiment one fan 72 with filter 70 is provided inside of rear portion 52 of the housing 52. The fan is used as a suction and air blow one.

In order to use the fan as a suction and air blow one, at the time of static elimination and at the time of cleaning, flow paths of air to fan are changed over. That is, at the time of cleaning as shown in FIG. 11*a,* valves 74 and 76 are respectively brought to the upper positions and therefore the fan works as a suction one. As shown in dotted arrows, outside air is sucked in through the openings 52*a* of the housing 52, and is passed through the filter 70 and the fan 72, and discharged through the opening 52*e*. Meanwhile at the time of static elimination as shown in FIG. 11*b* the valves 72 and 74 are respectively brought to the lower positions. The fan 72 works as an air blow one. As shown in solid arrows, the outside air is sucked in through the opening 52*d* of the housing 52, passed through the filter 70 and the fan 72, sent toward the discharge needles 54, and finally discharged through the openings 52*a*.

7th Embodiment

Figure 12A:
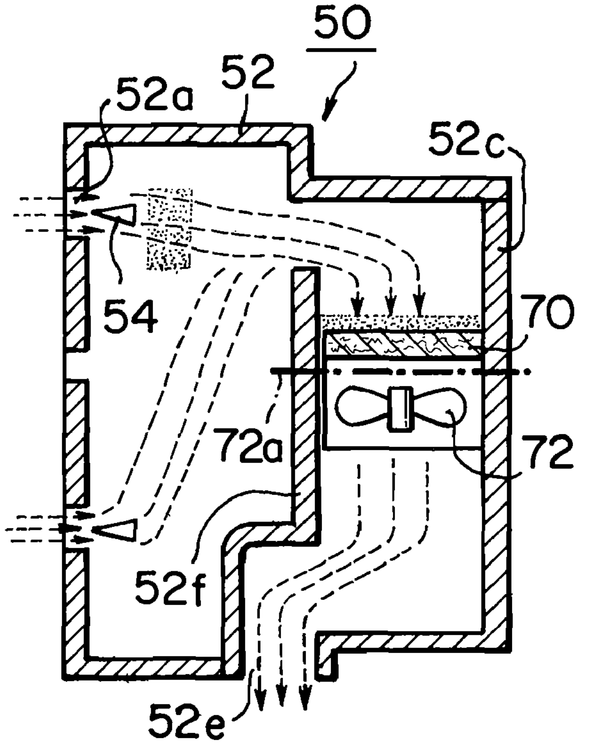
FIG. 12*a* shows the state inside of the static eliminator at the time of cleaning.
Figure 12B:
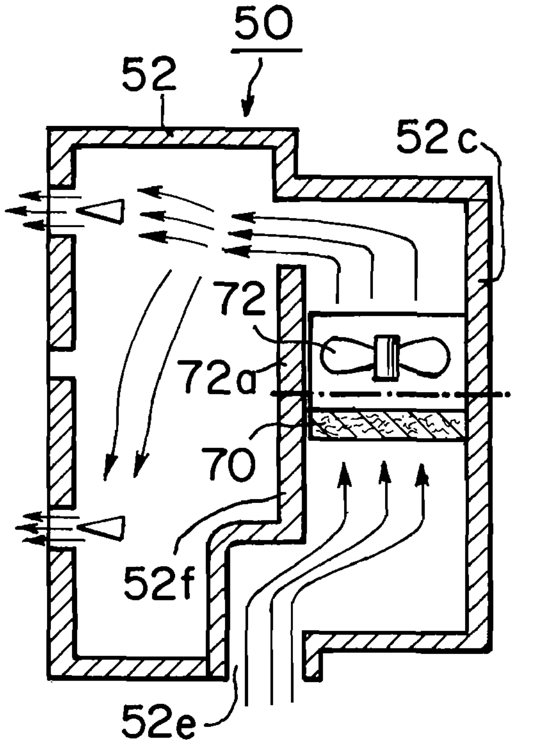
FIG. 12*b* shows the state inside of the static eliminator at the time of discharging.

FIG. 12 is a cross sectional view for explanation of a box type of static eliminator with a fan according to the 7th embodiment of the present invention, FIG. 12*a* shows the state inside the static eliminator at the time of cleaning, and FIG. 12*b* shows the state inside the static eliminator at the time of discharging. In FIG. 12, for convenience of drawing, the brush, the arm, and the brush driver as shown in FIG. 9 are omitted. In FIG. 12 a suction and air blow fan is used as is the case with the 6th embodiment. The fan is mounted on the housing 52 between the rear portion 52*c* and the partition wall 52*f* so that the fan is rotatable around an axis of rotation 72*a*.

In the embodiment, the fan 72 is caused to rotate about the axis 72*a* in order to change over the directions of air blow from the fan 72. That is, at the time of cleaning as shown in FIG. 12*a* the filter 70 is positioned above the fan 72 and sends the air downwardly. The fan 72 works as a suction one. As shown in dotted arrows, outside air is sucked in through the openings 52*a* of the housing 52, and is passed through the filter 70 and the fan 72, and discharged through the opening 52*e*. Meanwhile at the time of static elimination as shown in FIG. 12*b,* the fan 72 is positioned above the filter 70. The fan 72 works as an air blow one. As shown in solid arrows, the outside air is sucked in through the opening 52*e* of the housing 52, passed through the filter 70 and the fan 72, sent toward the discharge needles 54, and finally discharged through the openings 52*a*.

8th Embodiments

The static eliminator described in 1 to 7 embodiments is provided with a controller, not shown, which actuates the above-mentioned discharge needles rotating mechanism or the arm swing mechanism and the fan with filter, that is, an air blow fan or a suction and air blow fan to carry out the cleaning operation. Alternatively the cleaning operation may be made by the external order signal or the signal from the outside or from the dust sensors of the discharge needles.

Figure 7:
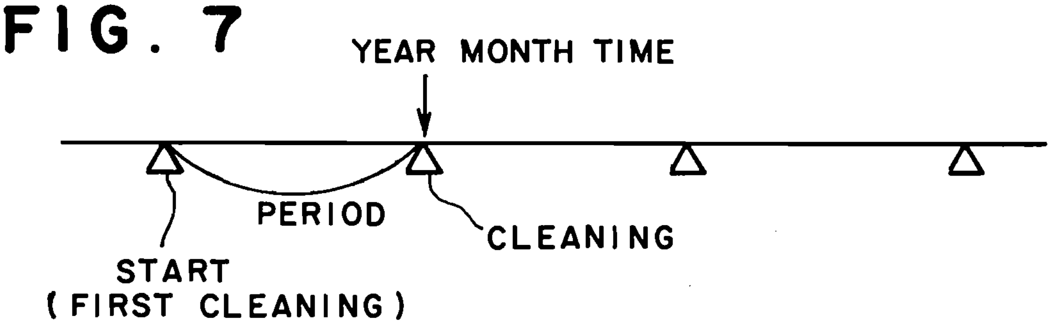
FIG. 7 is a view for explanation of the timing of control of elimination operation and cleaning operation.

FIG. 7 is a view for explanation of the timing of control of elimination operation and cleaning operation. In FIG. 7, the static eliminator usually eliminates static charge. A first cleaning is made to clean the discharge needles on the basis of control by the controller. At that time, cycle data and time data are input and compared with actual date and time. When it comes to the input time, the cleaning is restarted, and after that time the cleaning will be carried out periodically.

Figure 8:
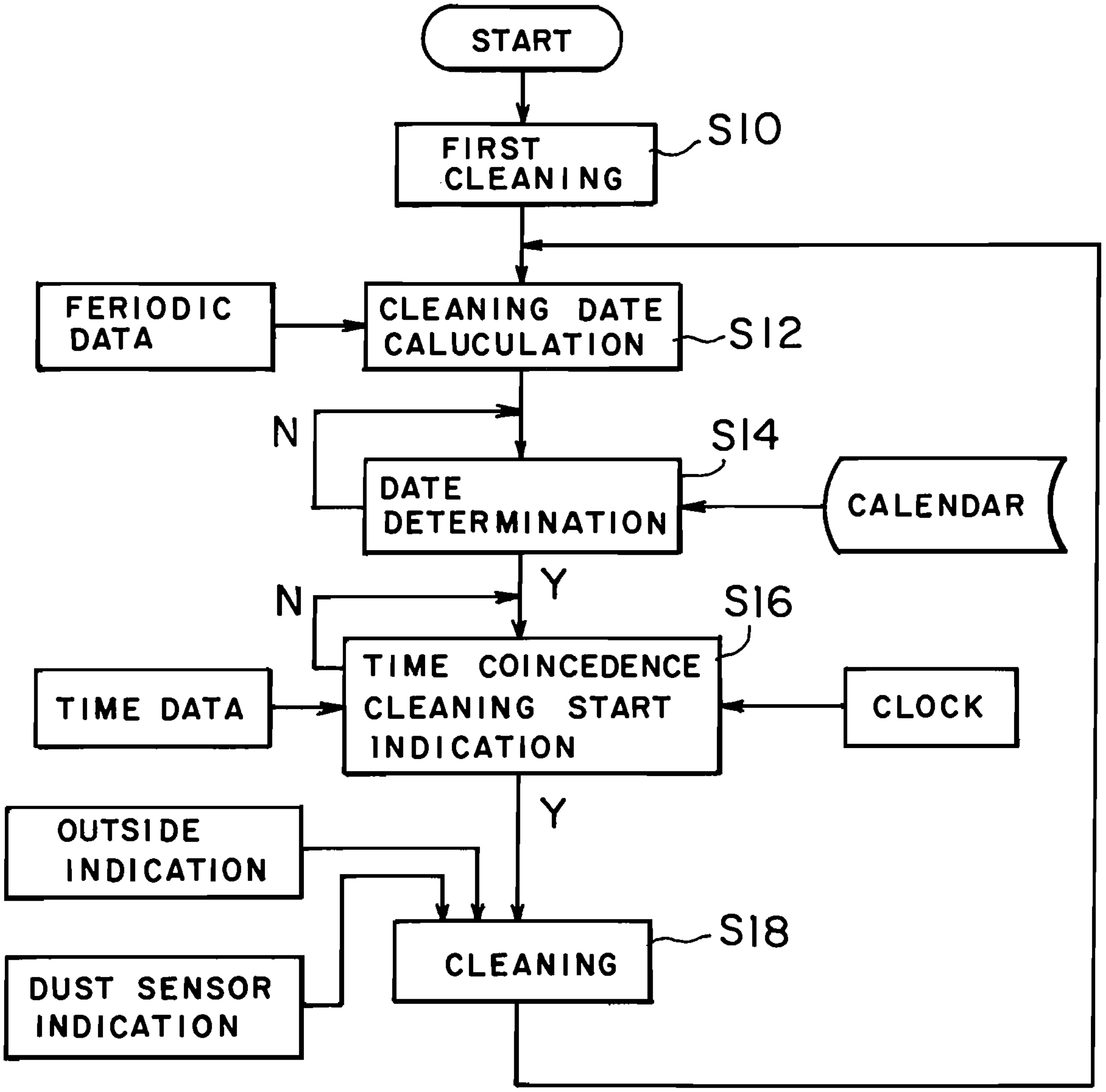
FIG. 8 is a flow chart for explanation of cleaning operation in accordance with the present invention.

FIG. 8 is a flow chart for explanation of cleaning operation in accordance with the present invention. At the beginning a first cleaning is carried out (step S10). Cycle data is input and the date for cleaning is calculated (step S12). Thereafter the date for cleaning and date input from the calendar are compared to judge as whether today is the cleaning date or not, and the cleaning date is waited for (step S14). When the cleaning date comes, the input time indicating data and the time input from the clock are compared and the time coincidence is waited for (step S16). When the time coincidence occurs, cleaning is carried out (step S18). Thereafter the step returns to S12 and the cleaning will be repeatedly carried out periodically.

Furthermore, the cleaning (step S18) is also carried out by the external order signal or the signal from the dust sensor. For example, when the cleaning operation is carried out periodically in accordance with the program, in case that the controller receives the external order signal, the program is interrupted in. In the case that the dust sensor senses the dust or contamination at the time of static elimination between the periodic cleanings and judges that the cleaning time comes, the program is also interrupted in. Then the cleaning operation is carried out.

Thereafter, a long time have passed and when the time of overhaul comes alarm may be issued to notify the user.

The invention claimed is:

1. A static eliminator whichcomprises at least one discharge needle for generating ions to eliminate static charge, a first hollow cylinder including at least one opening for ions generated by said at least one discharge needle to be emitted outside and fixedly provided with brushes for cleaning said at least one discharge needle, a second hollow cylinder provided with said at least one discharge needle and rotatably disposed inside said first hollow cylinder, a discharge needle rotating mechanism for causing to rotate said second hollow cylinder around the axis thereof to clean said discharge needle by wiping said discharge needle with said brushes fixedly provided with said first hollow cylinder.

2. A static eliminator according to claim 1 in which a plurality of discharge needles are disposed inside of said second hollow cylinder in a direction of axis thereof.

3. A static eliminator according to claim 1 which comprises a fan with a filter for sucking air in and sending the air toward the filter to collect the dust floating inside the second hollow cylinder after cleaning of the discharge needle to discharge clean air outside, and a power supply for feeding said discharge needle, said discharge needle rotating mechanism, and said fan with a filter.

4. A static eliminator according to claim 1 in which said second hollow cylinder includes ion emitting openings in alignment with said openings of said first hollow cylinder in the rotational position of the second hollow cylinder when ions are generated for static elimination, and one outside air suction opening in alignment with one of openings of said first hollow cylinder in the rotational position of the second hollow cylinder when the discharge needle is cleaned.

5. A static eliminator according to claim 4 in which the outside air suction opening of said second hollow cylinder is provided so as to be in alignment with one opening of said first hollow cylinder in the end position opposite to the position of said fan with a filter.

6. A static eliminator according to claim 4 in which said second hollow cylinder has a portion for closing openings of said first hollow cylinder except the opening in alignment with the outside air suction opening of said second hollow cylinder at the rotational position of said second hollow cylinder when discharge needles are cleaned.

7. A static eliminator according to claim 1 in which the cleaning of said discharge needles is carried out in accordance with a predetermined program, external order or indication of dust sensor for discharge needle.

8. A static eliminator according to claim 7 in which said predetermined program includes calendar data, periodic data for cleaning, and time data for cleaning, and said predetermined program is run in accordance with these data.

9. A static eliminator according to claim 3 in which said discharge needle rotating mechanism, said power supply and said fan with a filter are disposed at one end portion of said first hollow cylinder.

10. A static eliminator according to claim 3 in which said discharge needle rotating mechanism and said power supply are disposed at one end portion of said first hollow cylinder, and said fan with a filter is disposed at the other end portion of said first hollow cylinder.

* * * * *